United States Patent

[11] 3,634,121

| [72] | Inventor | Bruce W. Brockett |
| --- | --- | --- |
| | | Dayton, Ohio |
| [21] | Appl. No. | 807,960 |
| [22] | Filed | Mar. 17, 1969 |
| [45] | Patented | Jan. 11, 1972 |
| [73] | Assignee | The National Cash Register Company |
| | | Dayton, Ohio |

[54] ACID-SENSITIZED RECORD SHEET
4 Claims, No Drawings

[52] U.S. Cl. .................................................... 117/36.2,
117/155, 117/100
[51] Int. Cl. .................................................... B41m 5/22
[50] Field of Search ........................................... 117/36.2,
36.8, 36.9, 100 S

[56] References Cited
UNITED STATES PATENTS

| 2,972,547 | 2/1961 | Tien ................................. | 117/36.2 X |
| --- | --- | --- | --- |
| 3,003,990 | 10/1961 | Umland et al. ................ | 117/100 S |
| 3,068,185 | 12/1962 | Stamberger ..................... | 117/100 S |
| 3,236,802 | 2/1966 | Ferringno ....................... | 117/100 S |
| 3,427,180 | 2/1969 | Phillips ........................... | 117/36.8 X |
| 3,455,721 | 7/1969 | Phillips et al. ................. | 117/36.2 |

*Primary Examiner*—Murray Katz
*Attorney*—Justin S. Compton

ABSTRACT: This invention relates to means for sensitizing sheet record material, such as paper, for developing color in applied colorless marking fluids which are essentially basic in chemical properties, the sensitization consisting of applying to the record material particles of paper-coating-type of fine mineral particles having adsorbed thereon acid-reacting oil-soluble polymeric material to develop strong colors in applied colorless marking liquids of oily nature. The polymeric materials of acid-reactant properties preferably are of the oil-soluble phenolic film-forming polymeric type, although other acid-reacting oil-soluble polymeric materials are eligible for use.

ACID-SENSITIZED RECORD SHEET

It is an object of the invention to provide polymeric-material-coated paper-coating microfine particles which combine whiteness, paper-coating characteristics, and extensive adsorbent sites for reception and deposit of acid-reacting polymeric materials, for the purpose of providing particulate coatings for sheet record material, such as paper, for the purposes mentioned.

In particular, it is contemplated to use the enormous surface area of paper-coating minerals of the kaolin-clay-type for holding adsorbed thereon an oil-soluble acidic polymeric material which dissolves in an applied oily ink in which is contained, in solution, one of the well-known colorless dyes of basic chemical properties, such as Crystal Violet Lactone, long used since its original disclosure in a coating system in U.S. Pat. No. 2,712,507, which was issued July 5, 1955, on the application of Barrett K. Green. In that patent, a small percentage of Crystal Violet Lactone was disclosed dissolved in an oily fluid retained as tiny droplets in microscopic capsules whose walls were made of pressure-rupturable film material consisting essentially of gelatin and other natural film-forming colloids. The capsules were coated in close juxtaposition on a paper sheet and transferred, by printing pressure, the contained oil to a copy-receiving sheet in contact therewith and sensitized with an acid reactant. The record material which is the subject of this invention has its main use as such a copy-receiving sheet which is placed under an overlying capsule-coated sheet like the one of the aforementioned Green U.S. patent, and receives, by printing or writing impression, liquid ink characters which are of the oily type, and which liquid, when coming into contact with the oil-soluble polymeric-material-coating, dissolves it, reacts with the solution, and forms an intensely colored product which is thus readable and is preserved on the acid-sensitized sheet surface.

It is intended, as a preferable particulate mineral material, to use kaolin for its excellent properties as a standard paper-coating material and for its fair properties of absorbing oily inks, whereby to improve the holding power of the copy-receiving sheet for applied marks, whereby a resolute print is made that will not bleed into the otherwise porous paper sheet.

It is intended that the kaolin particles, at least in part, be coated with the polymeric material. The large surface area provided by the naturally fine particulate form of kaolin increases enormously the possibility of solution of the polymeric material on contact with the capsule-released ink liquid while leaving some part of the surface free to act as an adsorbent for the applied marking fluid. The reacted colorless dye thus forms color on the particles themselves, much as a lake is produced. To this end, the particles of kaolin, after being coated with polymeric material, may be comminuted to a smaller size which reveals new and uncoated areas to act in the adsorbent capacity.

The mineral particles serve, therefore, in two functions: first, to act as a deploying surface for the applied polymeric material in order that its chemical properties may be employed to the utmost; and, second, to serve to hold the capsule-released ink or marking fluid in place after it is transferred from the oversheet to the novel sensitized sheet and colored in situ. While kaolin is cheap and universally used as a paper-coating material, other paper-coating minerals may be used according to the properties desired in the sensitized sheet from a rheological standpoint, as well as from a paper-sizing standpoint, even to the point of providing some of the acidic chemical properties needed to convert the colorless basic dye material to its colored form. Acidic polymeric materials heretofore have been applied to paper as a finely ground solid, in U.S. Pat. application Ser. No. 420,193, filed by Paul S. Phillips, Jr., and Gerald M. Hein on Dec. 21, 1964, now U.S. Pat. No. 3,455,721 and as film solution deposits, as disclosed in application for U.S. Letters Patent of Robert E. Miller and Paul S. Phillips, Jr., Ser. No. 392,404, filed Aug. 27, 1964, now abandoned to receive the colorless ink. The British patent application corresponding to the U.S. patent application of Phillips and Hein, to which reference was made above, issued as British Pat. No. 1,065,587 on Oct. 1, 1965, and the Canadian patent application corresponding to the U.S. patent application of Miller and Phillips, to which reference was made above, issued as Canadian Pat. No. 768,039 on Sept. 26, 1967.

To indicate some values as to the amount of material used in practicing this invention, it is preferred to use as little as 3½ pounds of the novel prepared particulate coated mineral material on a 33 pounds per 500-sheet ream of paper of 25 by 38 inches sheet dimension. Of this coating weight, as little as 4 percent by weight, and up to 8 percent, by weight, is phenolic material, and the remainder is 16 percent paper-coating binder and 78 percent particulate material (the mineral). The coated particles may be applied as an aqueous slurry to the sheet material. The following phenolic polymeric materials constitute a few of the eligible ones which are to be dissolved to the indicated extent in 200 grams of ethyl alcohol or equivalent evaporable solvent:

a. 2.4 grams of 3:1 p chloro-p octyl phenolic resin and 9.6 grams of p t-butyl phenolic resin.

b. 3.2 grams of 3:1 p chloro-p octyl phenolic resin and 12.8 grams of p t-butyl phenolic resin.

c. 4 grams of 3:1 p chloro-p octyl phenolic resin and 16 grams of p t-butyl phenolic resin.

d. 16 grams of 3:1 p chloro-p octyl phenolic resin.

e. 16 grams of p t-butyl phenolic resin.

f. 16 grams of p octyl phenolic resin.

g. 16 grams of p phenyl phenolic resin.

h. 16 grams of 4 parts p t-butyl to 1 part 3:1 p chloro-p t-butyl phenolic resin.

These solutions are coated on clay and dried in any manner, as by blowing in a fluidized bed, and said coated clay particles are then coated on a sheet in the indicated amounts with a sufficient amount of paper-coating binder to adhere the particles to the sheet without masking the polymer or the exposed surfaces of the clay to any considerable extent. The use of these particles coated with polymer avoids costly grinding of solid polymer material to a fineness suitable for coating paper in the fashion of Phillips and Hein. The total polymer-bearing clay coating for the ream of paper designated should be about 200 grams. Various dispersing agents, antifoaming agents, and adhesive agents may be used, as the situation requires and as dictated by common paper-coating practices.

The preferred kaolin pigment may be replaced, in part or in whole, by other particulate materials associated with paper-making, such as calcium carbonate, zinc oxide, and attapulgite to the extent desired to give proper coating properties to the paper for the purpose of receiving and developing color in the oily printing fluids.

Any method of applying the polymeric material in small quantities to the surface of the particulate material may be employed, such as spraying; deposition from liquids, other than the specified alcohol, of faster or slower drying tendencies; or grinding the polymeric material together with the clay, which becomes adhered thereto through the natural adhesion of the polymeric material to the clay particles. In connection with the application of the phenolic material through a grinding type of application, it is possible to add some small amount of solvent for the phenolic material, to aid in the adherence of the polymeric material to the clay or other particulate material.

The amount of phenolic material used in the sensitization of this novel sheet is extremely small as compared to the sensitization with polymeric material by merely adding particles of the polymeric material in a coating mixture to the sheet, as in the latter instance the spreading qualities are not coincidental with, but are much less than, the area of the mineral particles'surfaces as a whole, and a much more efficient and uniform system is provided by this new particle-coated system, with consequent immediate and intense appearance of color from a printing operation.

While a great many examples have been given of acid polymeric materials, reference is made to Canadian Pat. No. 768,039 which issued on Sept. 26, 1967 (Robert E. Miller and Paul S. Phillips, Jr., inventors), for a more extended list of polymeric materials better suitable for functioning as the acidic material in this system. That same patent gives an extended list of colorless basic chromogenic materials which develop strong color on acidic polymeric material.

It is within the purview of this invention to use the adhesive qualities naturally inherent in polymeric the adhesive qualities naturally inherent in polymeric film-forming materials, such as those named, to adhere the coated clay particles to the sheet, and in this type of construction more than the indicated proportions of polymeric material may be used for adhesive purposes without necessarily entering into the color formation reaction.

An autogenous sheet (that is to say, a sheet which has all the color-forming materials associated with it and which yields a mark in response to pressure) is disclosed in the application of this inventor, together with John W. Stutz and Daniel J. Kay, for United States Letters Patent, Ser. No. 770,878, filed July 2, 1968, wherein ground particles of phenolic polymeric material are associated with kaolin and colorless-printing fluid-retaining capsules of the specified microsize. It is a point of the instant invention that the polymeric-material-coated kaolin or other mineral may be substituted for the ground polymer particles constituting the autogenous sheet acid materials, in whole or in part, with a consequent improvement in efficiency in materials usage and in response to pressure.

Acid polymeric materials and coresponsive basic colorless chromogenic materials may be used alone or mixed in any proportion to meet the economic and aesthetic needs of the market, and in a large measure the base color of the substrate paper sheet may be varied, as long as there is visible contrast with the produced color.

In a like manner, there are some clay particles, such as attapulgite, which are sufficiently acid in their own right to develop color in colorless basic-reacting color-forming materials, and they may act in cooperation with the phenolic material to give a corresponding contribution to the total color developed.

EXAMPLES

Ethanolic sample solutions of various eligible phenolic resins were made up, using for each solution the weights of resin shown in the Table and 200 grams of 95 percent ethanol. To each of the ethanolic resin solutions was added the corresponding weight of clay or pigment shown in the Table. The resultant slurries were blended at high speed in an Osterizer for 5 minutes to give a thickened slurry, which was spread out on aluminum foil and dried in a circulating air oven at about 50° C., with occasional mixing to facilitate even drying. The dried resin-covered pigment masses were broken up with a mortar and pestle to give free-flowing powders.

In each case, a paper-coating formulation was prepared with the resin-coated pigment powders and coated on a paper surface with a Mayer rod coater to give a dried total coat weight of 5.0 pounds (±0.5 pound) per ream of 500 sheets measuring 25 × 38 inches. The paper-coating formulation used in each case was as follows:

|  | Weight (grams) | Dry Weight (grams) |
| --- | --- | --- |
| Resin-coated pigment particles | 100 | 100 |
| Water | 100 | — | blended in the Osterizer at high speed for 5 minutes in the presence of a trace of an anionic-dispersing agent such as Tamol 731, which is sold by Rohm and Haas Company, Philadelphia, Penna., United States of America and then further compounded with binder materials:

Ethylated

|  | Weight (grams) | Dry Weight (grams) |
| --- | --- | --- |
| Ethylated corn starch (20%, aqueous) | 45 | 9 |
| Styrene-butadiene latex (50%, aqueous) | 14 | 7 |
| Water | 100 |  |

The coated papers were trimmed, calendered between steel rolls, and tested against one another as to their ability to develop a print. The results are shown in the Table under the columns headed "Typewriter Intensity," (TI) where the lower the Typewriter Intensity number, the more intense and better the print. The testing method follows the Table.

| Resin as percent of total coat | Resin (amount in grams) | Clay or pigment (amount in grams) | 20 min. | 48 hrs. |
| --- | --- | --- | --- | --- |
| 5.2 | A (2.4) + B (9.6) | Kaolin (188) | 56 | 48 |
| 6.9 | A (3.2) + B (12.8) | Kaolin (184) | 40 | 43 |
| 8.6 | A (4.0) + B (16.0) | Kaolin (180) | 45 | 40 |
| 6.9 | A (16.0) | Kaolin (184) | 42 | 40 |
| 6.9 | B (16.0) | do | 53 | 46 |
| 6.9 | C (16.0) | do | 68 | 58 |
| 6.9 | D (16.0) | do | 40 | 38 |
| 6.9 | B (12.8) + E (3.2) | do | 54 | 46 |
| 6.9 | B (12.8) + E (3.2) | Silton clay (184) | 44 | 45 |
| 6.9 | B (12.8) + E (3.2) | Zinc oxide (184) | 51 | 46 |
| 6.9 | B (12.8) + E (3.2) | Calcium carbonate (184) | 52 | 37 |
| 1.7 | B (4.0 + zinc chloride (10.0) | Kaolin (186) | 45 | 40 |

Resin A is a mixed phenolic-formaldehyde resin in which the phenolic components are derived from 3 parts of p-chlorophenol and 1 part of p-octyl phenol. Resin B is p-tert-butylphenol-formaldehyde resin. Resin C is p-octylphenol-formaldehyde resin. Resin D is p-phenylphenol-formaldehyde resin. Resin E is a mixed phenolic-formaldehyde resin in which the phenolic components are derived from 3 parts of p-chlorophenol and 1 part of p-tert-butylphenol.

The test prints were made using a manifold pair consisting of a capsule-coated sheet which is made according to the teaching of U.S. Pat. No. 2,712,507, to which reference has been made, and which is commonly available as "NCR CB Paper" sold by the National Cash Register Company, assignee herein, capsule-coated side against the sensitized surface of an undersheet made according to the teaching of the instant specification, by use of an "Electromatic" typewriter manufactured by International Business Machines Corporation, in order to get a standard print specimen.

In general, about 150 percent of the amounts of resin shown in the Table are required to give equivalent Typewriter Intensities when the resin is present, as in the prior coating of Phillips and Hein, as finely ground particles interspersed with the pigment particles. This absolute advantage of the resin-coated pigment combination of this invention in the economy of using less resin than is required by the currently used method of laying down an aqueous dispersion coating of pigment particles and ground resin particles, as in Phillips and Hein, is a principal point of novelty of the present invention.

The other points of novelty of ease of coating and preparation of materials are of considerable importance in manufacture of the novel sheet and sensitizing particles which are claimed.

What is claimed is:

1. An acid-sensitized record sheet material, for the development of color in applied basic colorless, chromogenic, oily marking liquids, having a surface coated with binder material and an acidic particulate material consisting of paper-coating mineral particles individually adsorptive coated at least in part with oil-soluble, acid-reactant, organic, polymeric film material said adsorptively coated particles being adsorptive of said oily marking liquids.

2. The record sheet material of claim 1 wherein the mineral particles are kaolin particles.

3. The record sheet material of claim 1 wherein the polymeric film material is a p-phenylphenol-aldehyde condensation product.

4. The record sheet material of claim 3 wherein the mineral particles are kaolin particles.

* * * * *